May 19, 1964 P. P. W. VARLET 3,133,826
HEAT HARDENABLE, POLYESTER RESIN COATING
Filed Feb. 21, 1961
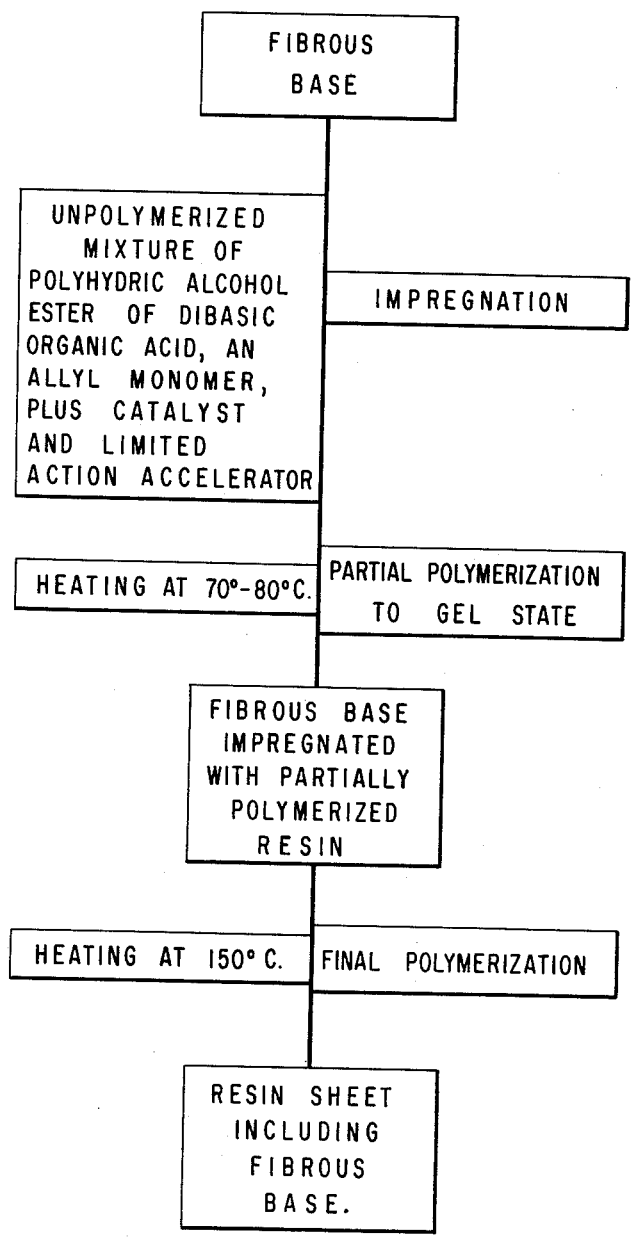
INVENTOR
PIERRE PAUL WILLIAM VARLET
BY
ATTORNEYS 3,133,826
HEAT HARDENABLE, POLYESTER
RESIN COATING
Pierre Paul William Varlet, Asnieres, France, assignor to Societe Anonyme des Usines Chausson, Asnieres, France, a company of France
Filed Feb. 21, 1961, Ser. No. 90,623
Claims priority, application France Mar. 3, 1960
8 Claims. (Cl. 117—62.2)

This invention relates to improvements in the manufacture of polymerizable compositions, and fabricated articles, from certain resins containing non-saturated polyesters and monomers.

These resins are formed of liquid or semi-liquid polymerizable components which polymerize together, in what is known as the oil phase, without splitting off a byproduct, e.g., water, to form, eventually, hard resins. Usually, this reaction is expedited by the use of an oxygen-containing polymerization catalyst such as benzoyl peroxide and other organic peroxides, but even so temperatures of about 150° C. are usually required for rapid polymerization which cannot be stopped when started.

It is the purpose of the invention to provide practical means to prepare compositions which can be easily used for impregnating a base such as paper, fiber glass, mat and other articles in the manufacture of sheet articles.

It is a further object of the invention to start, by applying a heat treatment at relatively low temperature, a polymerization or gelation which can be stopped at a desired degree of viscosity, i.e. when the resins are brought in a gel state of desired hardness for which the article is able to be mechanically shaped by means of commonly used devices, more particularly, by a stamping press.

Additional objects and advantages of the invention will become apparent from the following description when read in connection with the flow sheet on the accompanying drawing.

In accordance with the invention, the polymerization which was stopped when the composition was brought in the gel state is started anew and rapidly achieved during shaping of the article in a lapse of time which is of about 15 to 20 seconds.

Further, in accordance with the invention there is provided a subsequent treatment which is carried out when the composition, more particularly, the article in sheet form is prepared, which comprises providing on one or both faces of said article a non-sticky surface so that the sheet can be stored without interposition of protective layers as is usually done and also so that said non-sticky surface is non-adherent to the tools used for shaping the article.

By considering a first method of execution mentioned above, the resinous composition is made in the following manner:

A mixture of polyesters is first of all prepared, for example, non-saturated polyesters, i.e., products obtained by condensing a molecule of a diacid, such as maleic, succinic, phthalic acid or the like with glycols or triols and with allylic monomers. A particularly suitable allylic monomer can be diallyl phthalate, obtained more particularly by combining phthalic anhydride with allylic alcohol.

Di-allyl phthate adipates, maleates, or the like, can also be used.

When the basic product is prepared, a polymerization catalyst is added, for example, benzoyl peroxide, then a group of limited action polymerization accelerators. This group of accelerators is advantageously formed by lauryl mercaptan, allyl mercaptan and dimethylformamide in which a solution of stannous chloride $SnCl_2$ is placed.

These various products are then mixed so that they are evenly distributed, then they are heated up to a temperature comprised between 70 and 80° during about 5 minutes.

After this latter operation, a product is obtained having the consistency of a more or less viscous jelly that can be regulated in various ways, as explained hereafter.

To stop the polymerization reaction started when the products are heated, it is advantageous to cool the mass obtained as soon as its viscosity reaches the value sought.

To regulate the viscosity of the jelly obtained, the most simple means is to modify the heating time, but another means consists of modifying slightly the composition of the group of limited action accelerators which is added to the prepared resin.

When the jelly is required to have a solid consistency, the dimethylformamide is replaced by derivatives of furfurane, for example, tetra-hydro-furfurane in which the stannous chloride can also be dissolved.

The derivatives can themselves be replaced by glycol and its derivatives, for example, di- tri-, or polyethyleneglycols.

If, on the contrary, the consistency of the jelly must be soft, the dimethylformamide is advantageously replaced by dioxane or else furfurol.

Now, considering that the product to be manufactured must consist of a reinforced sheet or plate, the reinforcement is coated or embedded in the resinous mass, preferably before the latter is heated so as to obtain an easy impregnation of the support and proper moistening of the latter by the resins.

In a second method of execution, the support is no longer impregnated with the whole of the prepared mass, but is pre-impregnated with the group of limited action accelerators, i.e., for example, with a mixture of lauryl mercaptan or allyl mercaptan and dimethylformamide containing stannous chloride in solution, this accelerating group being eventually diluted in a volatile solvent which is evaporated after the support has been properly impregnated.

When the product obtained according to one of the two methods of execution above is intended to be preserved for a very long time, exceeding three weeks, it is advantageous to add, in addition to the constituents mentioned above, a polymerization inhibitor, such as a solution of 4-methyl-2,6-di-butyl-tertiary phenol or any other known product for this function and compatible with those defined above.

In an example giving particularly satisfactory results for making sheets intended to be subsequently shaped by mechanical stamping, a fibrous support is impregnated by a resin mass containing:

| | |
|---|---|
| Unsaturated polyester _____g__ | 65 |
| Diallyl adipate _____g__ | 35 |
| Benzoyl peroxide _____g__ | 2 |
| Lauryl mercaptan _____cm.³__ | 0.4 |
| Solution of stannous chloride $SnCl_2$ in dimethylformamide _____cm.³__ | 0.7 |

The impregnated sheet is then heated up to 70° C. for 5 minutes, then cooled down to 22° C. The two faces of the sheet, which are slightly sticky, are then given a surface treatment to form a smooth surface and non-sticking skin.

To obtain this result, both faces of the sheet are subjected to the action of polymerization accelerators formed by dimethylaniline deposited by causing the sheet to pass against felts impregnated with this accelerator.

This sheet is then preserved at a temperature around 20° C. during three weeks. It is then shaped by stamping in a mechanical press whose tools are heated to 150° C. The time held under the press is 15 seconds, and when the tools are removed, the part obtained is perfectly polymerized.

The invention is not restricted to the examples of embodiment described in detail, for various modifications can be applied to it without going outside of its scope.

I claim:

1. Process for the two-stage formation of a polyester resin which comprises in a first stage partially polymerizing a mixture of a polyhydric alcohol ester of a dibasic organic acid and an allyl monomer in the presence of an oxidation type polymerization catalyst and in the presence of a fibrous support and of a limited action polymerization accelerator composition including a mercaptan and stannous chloride in solution in a solvent modifying the accelerating action of the stannous chloride at a temperature between about 70° and about 80° C. for about 5 minutes to obtain a partial polymer in the form of a viscous jelly impregnating said support, cooling the jelly to about 22° C., treating the resin with a polymerization accelerator at said cool temperature, and then in a second stage completing the polymerization with application of heat at a temperature of about 150° C.

2. Process for the formation of a polyester resin impregnated base material, which comprises the steps of impregnating a base material with a mixture of a polyhydric alcohol ester of a dibasic organic acid and an allyl monomer and an oxidation type polymerization catalyst and a limited action polymerization accelerator composition, including a mercaptan and stannous chloride in solution in a solvent modifying the accelerating action of the stannous chloride, applying heat thereto at a temperature of about 70°–80° C. for about 5 minutes to form a partial polymer in the form of a viscous jelly, cooling the mass to about 22° C., applying to the surface of the polymer a polymerization accelerator to form a non-sticking polymer film thereon, and then completing the polymerization by the application of heat at a temperature of about 150° C.

3. The process of claim 2 in which the oxidation type polymerization catalyst is benzoyl peroxide.

4. The process of claim 2 in which the limited action polymerization accelerator is lauryl mercaptan in combination with stannous chloride.

5. The process of claim 2 in which the base material is a fibrous sheet.

6. The process of claim 2 in which the partial polymer impregnated material is preserved at about 20° C. for an extended period before final polymerization.

7. The process of claim 2 in which the consistency of the viscous partial polymer jelly is regulated by incorporating with the limited action polymerization accelerator, dimethylformamide.

8. The process of claim 2 in which the consistency of the viscous partial polymer jelly is regulated by incorporating with the limiting action polymerization accelerator, tetrahydrofuran.

References Cited in the file of this patent

UNITED STATES PATENTS

| | | |
|---|---|---|
| 2,467,527 | Harris | Apr. 19, 1949 |
| 2,978,354 | Lesser | Apr. 4, 1961 |

FOREIGN PATENTS

| | | |
|---|---|---|
| 456,316 | Canada | May 3, 1949 |
| 457,049 | Canada | May 31, 1949 |
| 139,660 | Australia | Dec. 8, 1950 |
| 140,611 | Australia | Apr. 4, 1951 |